(12) United States Patent
Lee et al.

(10) Patent No.: US 11,620,519 B2
(45) Date of Patent: Apr. 4, 2023

(54) BIG DATA-BASED DRIVING INFORMATION PROVISION SYSTEM AND METHOD THEREOF

(71) Applicants: HYUNDAI MOTOR COMPANY, Seoul (KR); KIA MOTORS CORPORATION, Seoul (KR)

(72) Inventors: Dong-Chul Lee, Anyang-si (KR); In-Soo Jung, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/923,787

(22) Filed: Jul. 8, 2020

(65) Prior Publication Data

US 2021/0182671 A1    Jun. 17, 2021

(30) Foreign Application Priority Data

Dec. 11, 2019  (KR) .......................... 10-2019-0164633

(51) Int. Cl.
*G06N 3/08*      (2006.01)
*G06F 16/28*     (2019.01)
(Continued)

(52) U.S. Cl.
CPC ............. *G06N 3/08* (2013.01); *F02D 41/009* (2013.01); *F02D 41/1405* (2013.01);
(Continued)

(58) Field of Classification Search
CPC ............... F02D 41/009; F02D 41/1405; F02D 41/1498; F02D 41/22; F02D 41/26; F02D 41/266; F02D 2200/10; F02D 2200/1015; G01M 15/042; G01M 15/05; G01M 15/12; G01M 17/007; G06N 3/0445; G06N 3/0454; G06N 3/08; G06N 3/088; G06N 20/00; G06F 16/285
See application file for complete search history.

(56) References Cited

U.S. PATENT DOCUMENTS 5,041,976 A  *  8/1991  Marko .................. G01R 31/007
                                              701/32.9
5,361,628 A  *  11/1994  Marko ................... F02D 41/22
                                                706/913
(Continued)

FOREIGN PATENT DOCUMENTS

DE          10352860 A1  *  6/2005  ........... F02D 35/027
DE     102014207683 A1  *  10/2015  ......... F02D 41/1402
(Continued)

*Primary Examiner* — John M Zaleskas
(74) *Attorney, Agent, or Firm* — Fox Rothschild LLP; Peter F. Corless

(57) ABSTRACT

A big data-based driving information provision system may include a sensor configured to measure and collect state monitoring data of an engine, vehicle monitoring data, and vibration data; an engine electronic control unit (ECU) configured to generate a combustion characteristic index (CCI) data of the engine; and a graphic controller configured to generate a primary deep learning model which classifies the big data including the state monitoring data, the vehicle monitoring data, the vibration data, and the CCI into at least two categories.

8 Claims, 8 Drawing Sheets

(51) Int. Cl.

| | | |
|---|---|---|
| *F02D 41/00* | (2006.01) | |
| *F02D 41/26* | (2006.01) | |
| *G01M 15/05* | (2006.01) | |
| *F02D 41/14* | (2006.01) | |
| *G01M 15/12* | (2006.01) | |
| *G06N 20/00* | (2019.01) | |

(52) U.S. Cl.
CPC ......... *F02D 41/1498* (2013.01); *F02D 41/26* (2013.01); *G01M 15/05* (2013.01); *G01M 15/12* (2013.01); *G06F 16/285* (2019.01); *G06N 20/00* (2019.01); *F02D 2200/10* (2013.01); *F02D 2200/1015* (2013.01)

(56) References Cited

U.S. PATENT DOCUMENTS

| | | | | |
|---|---|---|---|---|
| 5,732,382 | A * | 3/1998 | Puskorius | G01M 15/11 123/436 |
| 6,131,444 | A * | 10/2000 | Wu | G01M 15/11 73/114.02 |
| 10,914,262 | B1 * | 2/2021 | Laskowsky | F02D 41/1405 |
| 2004/0143398 | A1 * | 7/2004 | Nelson | G01H 1/00 702/14 |
| 2006/0122809 | A1 * | 6/2006 | Clarke | G01H 1/00 702/185 |
| 2006/0122810 | A1 * | 6/2006 | Clarke | G01H 1/00 702/185 |
| 2006/0212209 | A1 * | 9/2006 | Cesario | F02D 41/1458 73/35.12 |
| 2007/0088550 | A1 * | 4/2007 | Filev | G05B 23/0221 704/245 |
| 2007/0283188 | A1 * | 12/2007 | Balzer | B60W 50/045 714/26 |
| 2008/0125929 | A1 * | 5/2008 | Prokhorov | G01M 15/042 701/31.4 |
| 2009/0192693 | A1 * | 7/2009 | Bottcher | F02D 41/402 701/102 |
| 2009/0192699 | A1 * | 7/2009 | Bottcher | F02D 41/1405 701/108 |
| 2009/0282903 | A1 * | 11/2009 | Nagano | G01P 3/489 73/114.15 |
| 2011/0232263 | A1 * | 9/2011 | Yasui | F01N 13/009 60/299 |
| 2016/0025027 | A1 * | 1/2016 | Mentele | F02D 41/22 701/102 |
| 2016/0025028 | A1 * | 1/2016 | Vaughan | F02D 41/1405 701/115 |
| 2016/0245209 | A1 * | 8/2016 | Bizub | F02D 41/1497 |
| 2016/0258378 | A1 * | 9/2016 | Bizub | G01L 23/221 |
| 2016/0298537 | A1 * | 10/2016 | Matthews | F02D 41/221 |
| 2018/0293814 | A1 * | 10/2018 | Gilbert | F02D 41/1406 |
| 2019/0145859 | A1 * | 5/2019 | Chen | G06N 3/0481 701/102 |
| 2019/0383705 | A1 * | 12/2019 | Smart | G01H 1/00 |
| 2020/0109678 | A1 * | 4/2020 | Nakamura | G06N 3/0481 |
| 2020/0118358 | A1 * | 4/2020 | Lee | G01M 15/12 |
| 2020/0182184 | A1 * | 6/2020 | Jin | F02P 5/045 |
| 2020/0234136 | A1 * | 7/2020 | Kitagawa | G05B 23/0254 |
| 2020/0248641 | A1 * | 8/2020 | Nakamura | F02D 41/2451 |
| 2020/0256753 | A1 * | 8/2020 | Mohri | G01L 23/222 |
| 2020/0393329 | A1 * | 12/2020 | Jung | G06N 3/0454 |
| 2021/0003088 | A1 * | 1/2021 | Chen | F02D 41/1498 |
| 2021/0017923 | A1 * | 1/2021 | Aso | F02D 41/1402 |
| 2021/0033039 | A1 * | 2/2021 | Hashimoto | G07C 5/085 |
| 2021/0053577 | A1 * | 2/2021 | Hashimoto | G06N 3/08 |
| 2021/0053578 | A1 * | 2/2021 | Hashimoto | G06N 3/08 |
| 2021/0054797 | A1 * | 2/2021 | Hashimoto | F02D 41/28 |
| 2021/0054800 | A1 * | 2/2021 | Hashimoto | F02D 41/26 |
| 2021/0056781 | A1 * | 2/2021 | Hashimoto | G07C 5/0841 |
| 2021/0062747 | A1 * | 3/2021 | Hashimoto | F02D 41/1405 |
| 2021/0088019 | A1 * | 3/2021 | Senda | F02D 35/023 |
| 2021/0102510 | A1 * | 4/2021 | Tanaka | G06N 3/084 |
| 2021/0209871 | A1 * | 7/2021 | Lee | G06N 3/0445 |

FOREIGN PATENT DOCUMENTS

| | | |
|---|---|---|
| KR | 20180029543 | 3/2018 |
| KR | 20190018798 | 2/2019 |
| KR | 20200071527 | 6/2020 |

\* cited by examiner

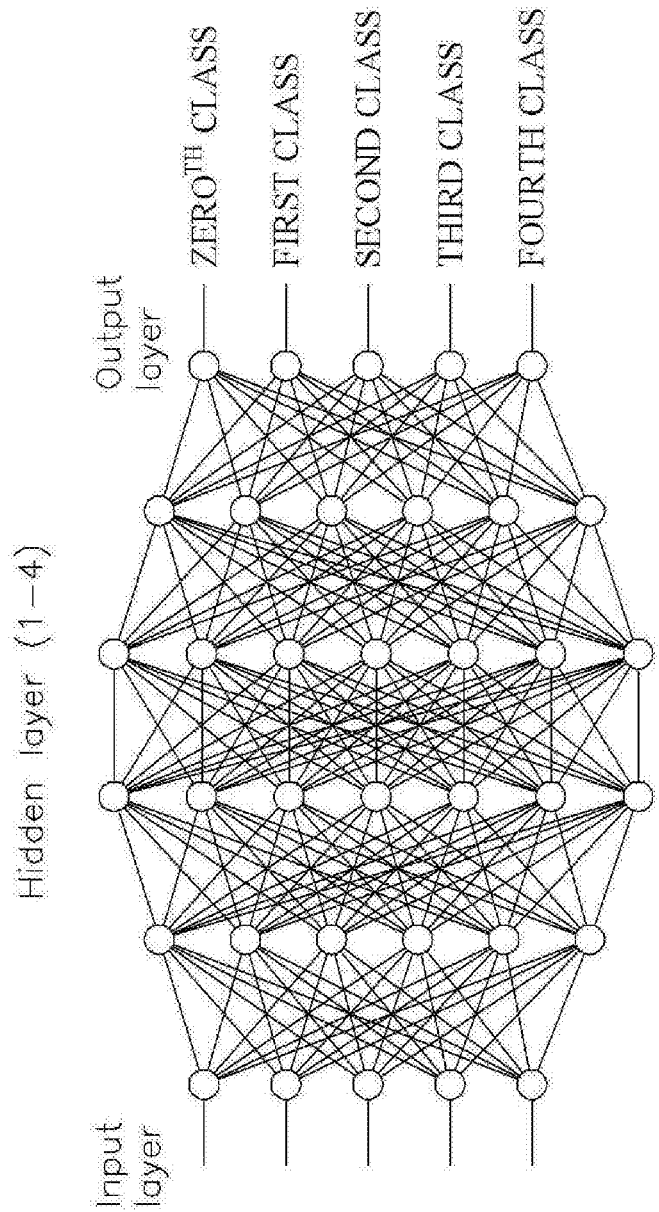

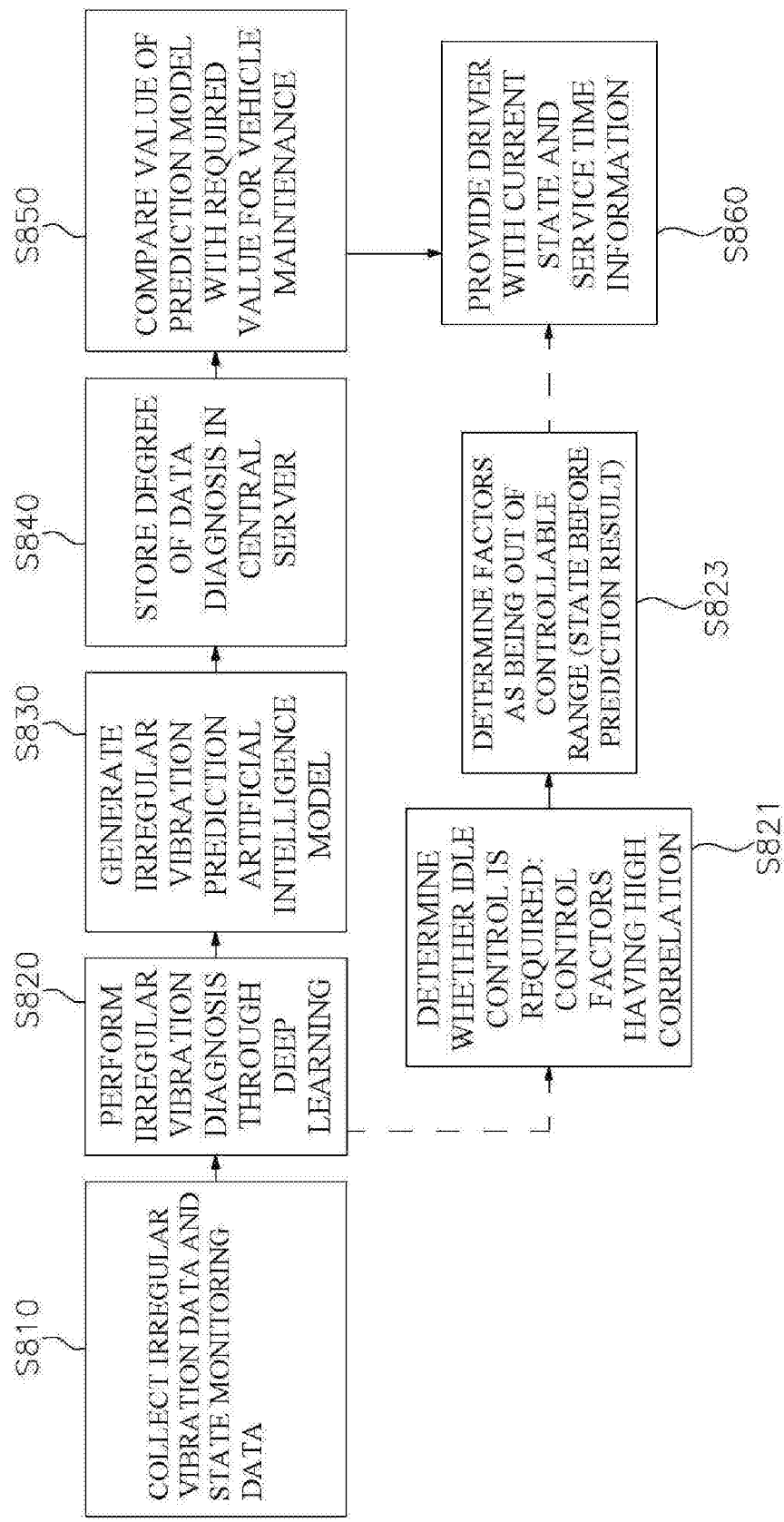

ic of an engine; classifying the collected big data according to types thereof using a deep learning model; and controlling a CCI of a problematic cylinder to be improved by analyzing the classified big data.

BIG DATA-BASED DRIVING INFORMATION PROVISION SYSTEM AND METHOD THEREOF

CROSS-REFERENCE TO RELATED APPLICATION

The present application claims priority to and the benefit of Korean Patent Application No. 10-2019-0164633, filed on Dec. 11, 2019, which is incorporated herein by reference in its entirety.

TECHNICAL FIELD

The present disclosure relates to a vehicle driving technology.

Further, the present disclosure relates to a system capable of diagnosing occurrence of an irregular vibration of idling and predicting a variation in performance according to an increase in travel distance on the basis of deep learning, and a method thereof.

BACKGROUND

The statements in this section merely provide background information related to the present disclosure and may not constitute prior art.

In an idle state, an irregular vibration is one among noise, vibration, and harshness (NVH) factors which give discomfort to a customer. This is because drivers and passengers feel very uncomfortable due to a vibration which intermittently occurs in an idle condition in which an NVH characteristic is small as compared to that of a driving condition.

A major factor influencing the irregular vibration in the idle state is that unbalance occurs due to combustion unless the irregular vibration does not intermittently and consistently occur due to an engine cylinder. The reason for frequent occurrence of the above phenomenon is due to a problem of an influence of control or durability progression of hardware (H/W).

When the number of occurrence times of the irregular vibration increases, it eventually develops to a H/W failure.

In consideration of the above description, a simple diagnosis technique on the basis of an engine roughness (ER) index is disclosed. However, the diagnosis technique is an algorithm capable of diagnosing only a current state so that prediction and/or cause analysis may be impossible. Further, it may also be impossible to determine a correlation between influence factors.

SUMMARY

A form of the present disclosure is directed to a big data-based driving information provision system capable of constituting big data by collecting data of sensors of a vehicle and an engine and environmental data, and a method thereof.

Another form of the present disclosure is also directed to a big data-based driving information provision system capable of analyzing and predicting a variation in combustion characteristic index (CCI) using a deep learning technique, and a method thereof.

Another form of the present disclosure is also directed to a big data-based driving information provision system capable of classifying a contribution of a major factor influencing on the variation in CCI and controlling to reduce an irregular vibration of idling when a problem occurs, and a method thereof.

Another form of the present disclosure is also directed to a big data-based driving information provision system capable of storing a diagnosis result in a server and informing a service period through individual management of a vehicle using a predictive model, and a method thereof.

In some forms of the present disclosure, there is provided a big data-based driving information provision system capable of constituting big data by collecting data of sensors of a vehicle and an engine and environmental data.

The big data-based driving information provision system includes a sensor part configured to measure and collect state monitoring data of an engine, vehicle monitoring data, and vibration data; an engine electronic control unit (ECU) configured to generate a combustion characteristic index (CCI) data of the engine; and a graphic controller configured to generate a primary deep learning model which classifies the big data including the state monitoring data, the vehicle monitoring data, the vibration data, and the CCI into at least 2 data categories.

Further, the primary deep learning model may classify combinations of the correlation coefficients between the big data in the at least 2 data categories.

Further, the big data may be classified into clusters by applying a k-means algorithm to the calculated correlation coefficients.

Further, after the k-means algorithm is applied, a Gaussian mixture model (GMM) and a deep neural network (DNN) may be additionally applied.

Further, the CCI may be calculated using a crank angle, an angular velocity, and an angular acceleration of the engine.

Further, the CCI may be calculated for each cylinder, and, when a median deviation value of a median with respect to a cylinder is larger than a threshold which is set in advance, a cylinder having a smallest minimum value may be determined as abnormal combustion.

Further, the at least 2 data categories may be generated for each cylinder of the engine.

Further, the at least 2 data categories may be expressed as irregular vibration indexes on the basis of the CCI and expressed as a grade and a vibration level which are matched to a range from a maximum value to a minimum value of the irregular vibration index.

Further, the graphic controller may generate a secondary deep learning model configured to predict an irregular vibration index in an idle state of the engine on the basis of the primary deep learning model.

Further, a vehicle control communication part or a communication terminal may receive service time information indicating a time required for an inspection service from a central server through a comparison between prediction information according to the secondary deep learning model and a required value for maintenance, which is set in advance.

In some forms of the present disclosure, there is provided a method of providing big data-based driving information, which includes collecting big data, which is collected on the basis of engine management system (EMS) data and controller area network (CAN) data, and collecting, by an engine electronic control unit (ECU), a combustion characteristic index (CCI) representing a combustion characteristic of an engine; classifying the collected big data according to types thereof using a deep learning model; and controlling a CCI of a problematic cylinder to be improved by analyzing the classified big data.

Further, the classification may further include generating a secondary deep learning model configured to predict an irregular vibration index in an idle state of the engine on the basis of the deep learning model.

Further, the controlling may include receiving, by a vehicle control communication part or a communication terminal, service time information indicating a time required for an inspection service from a central server through a comparison between prediction information according to the secondary deep learning model and a required value for maintenance, which is set in advance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 illustrates an example of a configuration of a deep neural network (DNN)-based irregular vibration grade classification model in one form of the present disclosure.

FIG. 8 is a flowchart illustrating a process of collecting an irregular vibration and data thereof and providing a driver with a current state and service time information in one form of the present disclosure.

Figure 1:
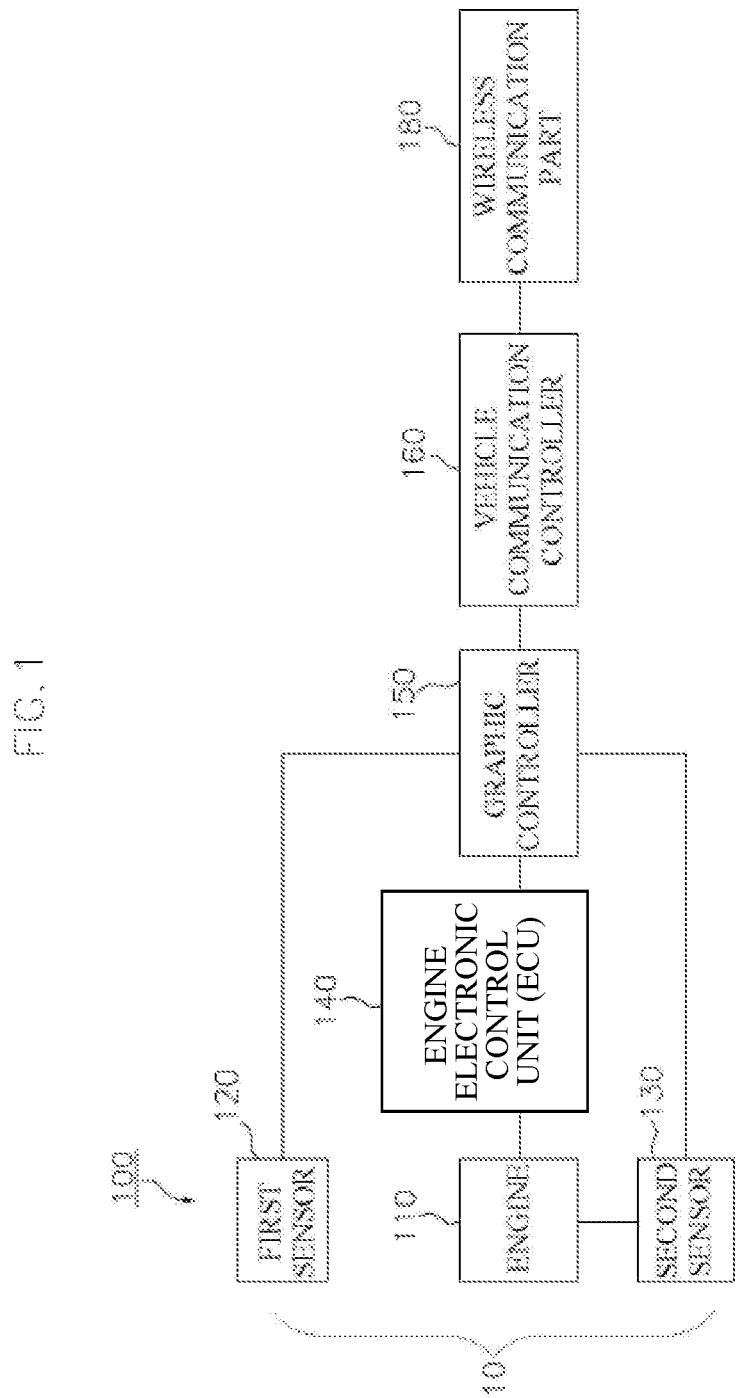
FIG. 1 is a configurational block diagram illustrating a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be modified into various forms and may have a variety of forms, and, therefore, specific forms will be illustrated in the drawings and described in detail. The forms, however, are not to be taken in a sense which limits the present disclosure to the specific forms, and should be construed to include modifications, equivalents, or substitutes within the spirit and technical scope of the present disclosure.

In describing each drawing, similar reference numerals are assigned to similar components. Although the terms "first," "second," and the like may be used herein to describe various components, these components should not be limited by these terms. The terms are used only for the purpose of distinguishing one component from another component.

For example, without departing from the scope of the present disclosure, a first component may be referred to as a second component, and similarly, a second component may also be referred to as a first component. The term "and/or" includes a combination of a plurality of related listed items or any item of the plurality of related listed items.

Unless otherwise defined, all terms including technical or scientific terms used herein have the same meaning as commonly understood by those skilled in the art to which the present disclosure pertains.

General terms that are defined in a dictionary shall be construed to have meanings that are consistent in the context of the relevant art, and should not be interpreted as having an idealistic or excessively formalistic meaning unless clearly defined in this disclosure.

Hereinafter, a big data-based driving information provision system and method thereof in some forms of the present disclosure will be described in detail with reference to the accompanying drawings.

FIG. 1 is a configurational block diagram illustrating a vehicle 100 in some forms of the present disclosure. Referring to FIG. 1, the vehicle 100 may include an engine 110, a first sensor 120, a second sensor 130, an engine electronic control unit (ECU) 140, a graphic controller 150, a vehicle communication controller 160, and a central server 220.

The first sensor 120 performs a function of generating vibration data of the engine 110. The second sensor 130 performs a function of generating vehicle information data except for the vibration data of an engine. That is, the second sensor 130 may perform a function of generating temperature information for monitoring a cooling water temperature, an oil temperature, interior and exterior air temperatures of the engine, and the like, pressure information for monitoring combustion, an environment, a boost, and the like, fuel injection equipment (FIE) information such as a fuel amount, a timing, and the like, or a variance in revolution per minute (RPM) for calculating a combustion characteristic index (CCI) in addition to various pieces of sensor information on a position sensor, a governor, and the like. The second sensor 130 may select subjects which do not overlap engine management system (EMS) data and may influence an idle vibration independently or separately.

Although the first sensor 120 and the second sensor 130 have been illustrated as being separated in FIG. 1, these sensors may be configured as a sensor part (10) which is an integrated sensor unit. Further, in order for understanding, although the first sensor 120 and the second sensor 130 have been illustrated as being separated from the engine 110 in FIG. 1, one of the first sensor 120 and the second sensor 130 may be configured to be integrated with the engine 110.

Alternatively, instead of separately installing the second sensor 130, the EMS data of the engine ECU 140 and controller area network (CAN) data of the vehicle communication controller 160 may replace the information of the second sensor 130.

The graphic controller 150 is a graphic processing unit (GPU) and performs diagnosis and prediction through deep learning on the basis of big data. In other words, an influence factor for each cylinder is classified on the basis of various pieces of engine state monitoring data, which includes a variance in engine RPM, and engine vibration data, and a probability of occurrence of abnormal combustion for each cylinder is analyzed. The influence factor for each cylinder may include the EMS data, environmental data, and the like.

Further, occurrence of a problematic cylinder and the CCI according to an influence factor condition are predicted. Further, a correlation between prediction of the problematic cylinder and an occurrence phenomenon in an actual vehicle is calculated. In order to perform the deep learning, the graphic controller 150 may include a GPU. Thousands to tens of thousands of arithmetic logic unit cores are disposed in the GPU. Therefore, a simultaneous parallel processing is possible.

The vehicle communication controller 160 serves to transmit and receive data with a controller of a component for controlling the vehicle 100. In particular, engine information may be transmitted from the engine ECU 140 for controlling the engine 110 to the graphic controller 150 through the vehicle communication controller 160.

The engine information may include the engine RPM, an engine starting, an idle state, and the like. The vehicle communication controller 160 may communicate with the engine ECU and a hybrid control unit (HCU). Although only the engine has been illustrated in FIG. 1, both the engine and a motor (not shown) may be provided. When the motor is provided, a motor controller (not shown) for controlling the motor may be provided. In order to control the motor, the motor controller may include an inverter, a converter, and the like.

The vehicle communication controller 160 performs a function of controlling communication between components in the vehicle 100. The communication between the components is connected through a multimedia-controller area network (MM-CAN), a body-CAN (B-CAN), a high-speed CAN, a communication line (e.g., 500 kbps), a CAN-flexible data-rate (CAN-FD) communication line, a FlexLay communication line, a local interconnect network (LIN) communication line, a power line communication (PLC) line, a control pilot (CP) communication line, and the like, and the communication is configured such that information is transmitted and received between controllers and a high-level controller transmits a command to a low-level controller.

The graphic process unit (GPU) that is the graphic controller 150 performs a function of transmitting or receiving data to or from the outside through a communication network 210 of the vehicle communication controller 160. To this end, a wireless communication part 180 may include a microprocessor, a communication circuit, and the like. Although only the wireless communication part 180 has been shown in the drawing, wired communication is also possible.

Further, although a memory has not been shown in FIG. 1, a memory may be configured. The memory may include at least one type of storage medium among a flash type memory, a hard disk type memory, a multimedia card micro type memory, a card type memory (e.g., a secure digital (SD) memory, extreme digital (XD) memory, or the like), a random access memory (RAM), a static random access memory (SRAM), a read only memory (ROM), an electrically erasable programmable ROM (EEPROM), a programmable ROM (PROM), a magnetic memory, a magnetic disk, and an optical disk.

Figure 2:
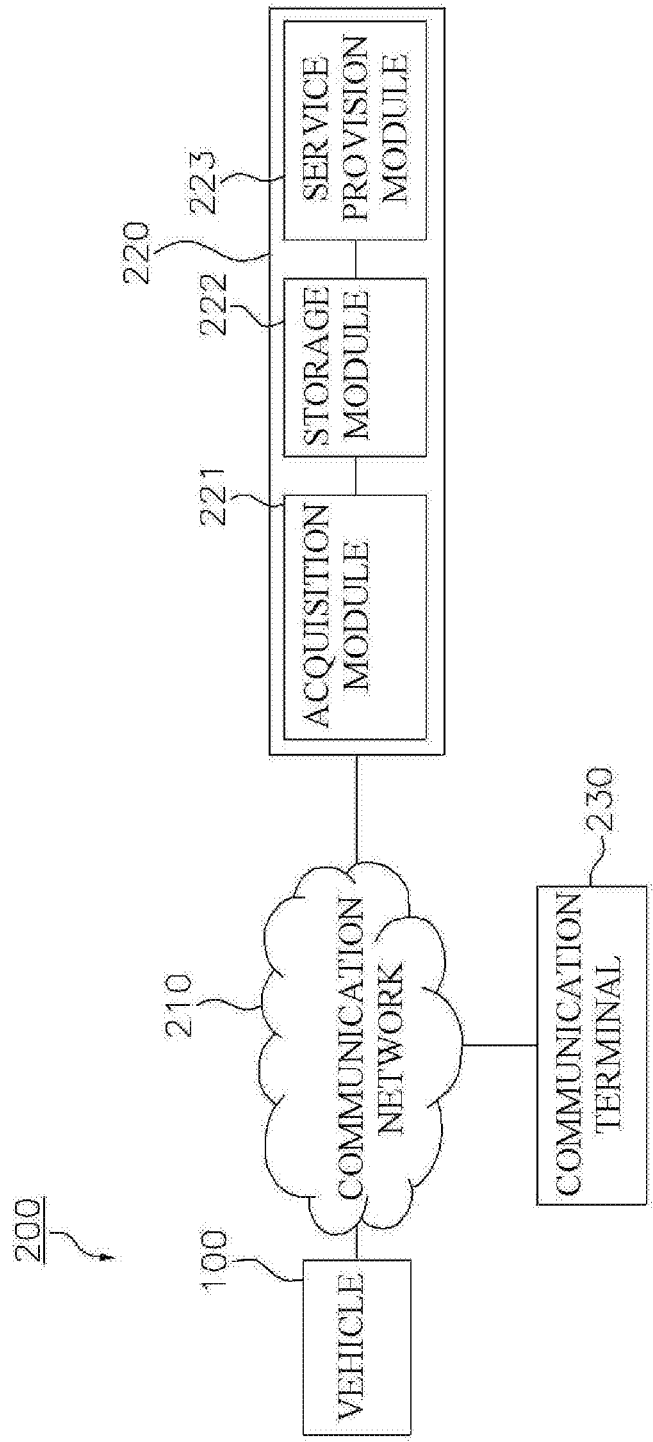
FIG. 2 is a configurational block diagram illustrating a big data-based driving information provision system in one form of the present disclosure.

FIG. 2 is a configurational block diagram illustrating a big data-based driving information provision system 200 in some forms of the present disclosure. Referring to FIG. 2, the big data-based driving information provision system 200 may include the vehicle 100, the communication network 210, the central server 220, a communication terminal 230, and the like. The wireless communication part 180 of the vehicle 100 may be communicatively connected to the central server 220 through the communication network 210.

The communication network 210 means a connection structure capable of exchanging information between nodes such as a plurality of terminals and a plurality of servers. The communication network 210 may be a public switched telephone network (PSTN), a public switched data network (PSDN), an integrated services digital network (ISDN), a broadband ISDN, a local area network (LAN), a metropolitan area network (MAN), a wide LAN (WLAN), or the like. However, the present disclosure is not limited thereto, and the communication network 210 may be a code division multiple access (CDMA) network, a wideband CDMA (WCDMA) network, a wireless broadband (Wibro) network, a wireless fidelity (WiFi) network, a high speed downlink packet access (HSDPA) network, a Bluetooth network, a near field communication (NFC) network, a satellite broadcasting network, an analog broadcasting network, a digital multimedia broadcasting (DMB) network, or the like. Alternatively, the communication network 210 may be a combination of the above wired and wireless communication networks.

The central server 220 may include an acquisition module 221, a big data storage module 222, and a service provision module 223. The acquisition module 221 may perform a function of acquiring big data generated by the vehicle 100 through the communication network 210.

The acquired data may include vehicle data, combustion data, engine control data, CAN data, environmental data, a combustion characteristic index (CCI), and the like. These data become big data again according to a variation in individual characteristic of the vehicle 100. The vehicle data may be data relating to driving and may include a driving mode, a driving distance, a driving speed, and the like.

Meanwhile, the engine control data and the environmental data may become various pieces of state monitoring data of the engine. The engine data may be data relating to the engine and may include an RPM, cylinder information, an engine displacement, and the like. The engine control data may be data relating to control of the engine and may include a cooling water temperature, an oil temperature, an air temperature, a combustion pressure, and the like.

The big data storage module 222 performs a function of storing the big data. To this end, a database (not shown) may be configured. The database may be configured in the central server 220 or configured as a separate database server.

The service provision module 223 performs a function of providing a driver with a current state and service time information. In other words, it is possible to diagnose occurrence of an irregular vibration in a deep learning-based idle state and predict a variation in performance according to an increase of a driving distance, and the diagnosis information and the prediction information are registered to provide an alarm to the driver prior to occurrence of a problem so that the driver may receive a service inspection on the vehicle 100. That is, the prediction information according to a durability progression is provided.

To this end, driver information and the vehicle information on the vehicle 100 are stored in the database in advance. The driver information may include a name, a phone number, an address, and the like, and the vehicle information may include a vehicle identification number (VIN), a production year, a type of vehicle, a type of engine, and the like.

The communication terminal 230 may be a terminal owned by the driver and may include a mobile phone, a smart phone, a laptop computer, a digital broadcasting terminal, a personal digital assistant (PDA), a portable multimedia player (PMP), a navigation, a note pad, and the like.

Figure 3:
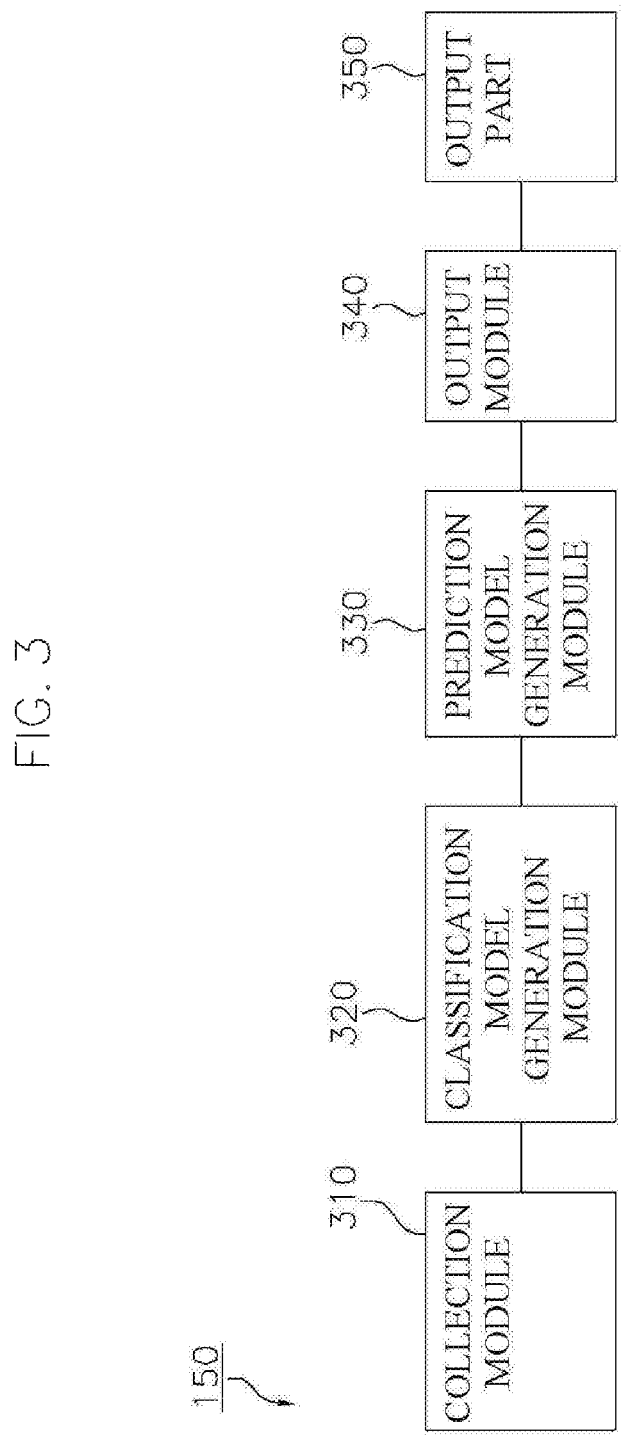
FIG. 3 is a detailed configurational block diagram illustrating a graphic controller shown in FIG. 1.

FIG. 3 is a detailed configurational block diagram illustrating the graphic controller 150 shown in FIG. 1. Referring to FIG. 3, the graphic controller 150 may include a collection module 310, a classification model generation module 320, a prediction model generation module 330, an output module 340, and an output part 350. The collection module 310 performs a function of collecting data generated by the sensors 120 and 130 and the engine ECU 140. In other words, the collection module 310 generates the big data by collecting vehicle monitoring data, the state monitoring data, and the CCI. The state monitoring data may be data indicating a state of the engine and may include the EMS data, the engine data, the engine control data, and the like. The vehicle monitoring data may be data indicating a state of the vehicle and may include the CAN data and the environmental data.

The CAN data is data relating to engine control, transmission control, and controls closely related to driving, such as control of an anti-lock brake system (ABS) (not shown), control of an active suspension (not shown), and control of a gear shift, as well as the CAN data is data relating to controls related to auxiliary devices of the vehicle, such as a mirror control device (not shown), a sunroof (not shown), a power window (not shown), a seat control device (not shown).

The CAN data may be a concept including the engine data, the vehicle data, and the environmental data. The environmental data may mean external data except for the data generated by the engine and the vehicle. Thus, the engine data, the vehicle data, and the environmental data are eventually all data capable of being acquired inside and outside the vehicle and used in the present disclosure. The vehicle data may also include a seat vibration signal generated from a seat, and the environmental data may be data capable of influencing noise, vibration, and harshness (NVH), including a temperature and a pressure of an outdoor air and may eventually include surrounding environment data, such as a road condition, of a vehicle.

The classification model generation module 320 performs a function of generating big data as a category classification model using deep learning. In other words, the classification model generation module 320 performs a function of classifying the big data into categories using correlation with the CCI.

That is, the classification model generation module 320 generates the category classification model that is a primary deep learning model. The category classification model is characterized by combining correlation variables which are sensitive to the CCI.

In this case, a threshold may include the CCI and a vibration level, and a correlation coefficient may include the EMS data, the CAN data, and the like. The CCI may include a level and cylinder information, and the EMS data may include an engine combustion control factor, information from various sensors, and the like. Further, the CAN data may include the vehicle information and the environmental data such as a temperature, a pressure, and the like.

The prediction model generation module 330 generates a prediction model for predicting whether an irregular vibration index and an irregular vibration occur in an idle state of the vehicle on the basis of representative category classification and a response characteristic of a CCI for each correlation variable combination. That is, the prediction model generation module 330 generates a prediction model that is a secondary deep learning model. In other words, the prediction model generation module 330 extracts a CCI for each category condition. For example, the prediction model generation module 330 classifies five representative categories, extracts a minimum value and a maximum value of a condition for each of the five representative categories, and applies a response characteristic model of the CCI for each combination of correlation coefficients. Accordingly, the prediction model generation module 330 predicts whether the irregular vibration and the irregular vibration index indicating a degree of the irregular vibration in the idle state of the vehicle occur on the basis of the category classification model extracted using the category classification and response characteristics of the CCI. Therefore, degradation of the CCI may be predicted in advance and used as a reference for robustness control.

When the prediction about the CCI is possible, an aging state may be predicted. In other words, it is possible to predict occurrence of a problem phenomenon in advance using the big data including information on a problematic cylinder and a vibration level among output information of the CCI.

Further, a control strategy for improving the CCI is possible. In other words, it is possible to select a control factor for improving the CCI for each classified category. In addition, when the prediction model generation module 330 is applied to an actual vehicle, it is possible to calculate and output a combustion control value for optimization of the CCI, condition classification, and reduction in the CCI in the same evaluation condition. Further, performance against the irregular vibration may be improved through diagnosis and control using artificial intelligence in the idle state of the engine.

Referring to FIG. 3 again, the output module 340 performs a function of predicting a variation in CCI on the basis of a current state of the engine generated by the prediction model generation module 330 and providing the driver with guidance information. The guide information may be constituted of a combination of voices, texts, and graphics.

The output part 350 performs a function of outputting the guide information. To this end, the output part 350 may include a sound system and a display. The display may be a liquid crystal display (LCD), a light-emitting diode (LED) display, an organic LED (OLED) display, a touch screen, a flexible display, a head-up display (HUD), or the like. In addition to the function of outputting the guide information, the output part 350 may be an input part for receiving a driver's command. That is, when the output part 350 is a touch screen, it is possible to input a driver's command.

The term "module" described in FIGS. 2 and 3 means a unit for processing at least one function or operation, and the unit may be implemented in software and/or hardware. The hardware may be implemented with an application specific integrated circuit (ASIC) designed to perform the above-described functions, a digital signal processor (DSP), a programmable logic device (PLD), a field programmable gate array (FPGA), a processor, a microprocessor, another electronic unit, or a combination thereof. The software may be implemented to include a software configuration component (element), an object-oriented software configuration component, a class configuration component, a task configuration component, segments of a process, a function, an attribute, a procedure, a subroutine, and a program code, a driver, firmware, a microcode, data, a database, a data structure, a table, an array, and a variable. The software and the data may be stored in a memory and executed by a processor. The memory or the processor may employ various parts well known to those skilled in the art.

Figure 4:
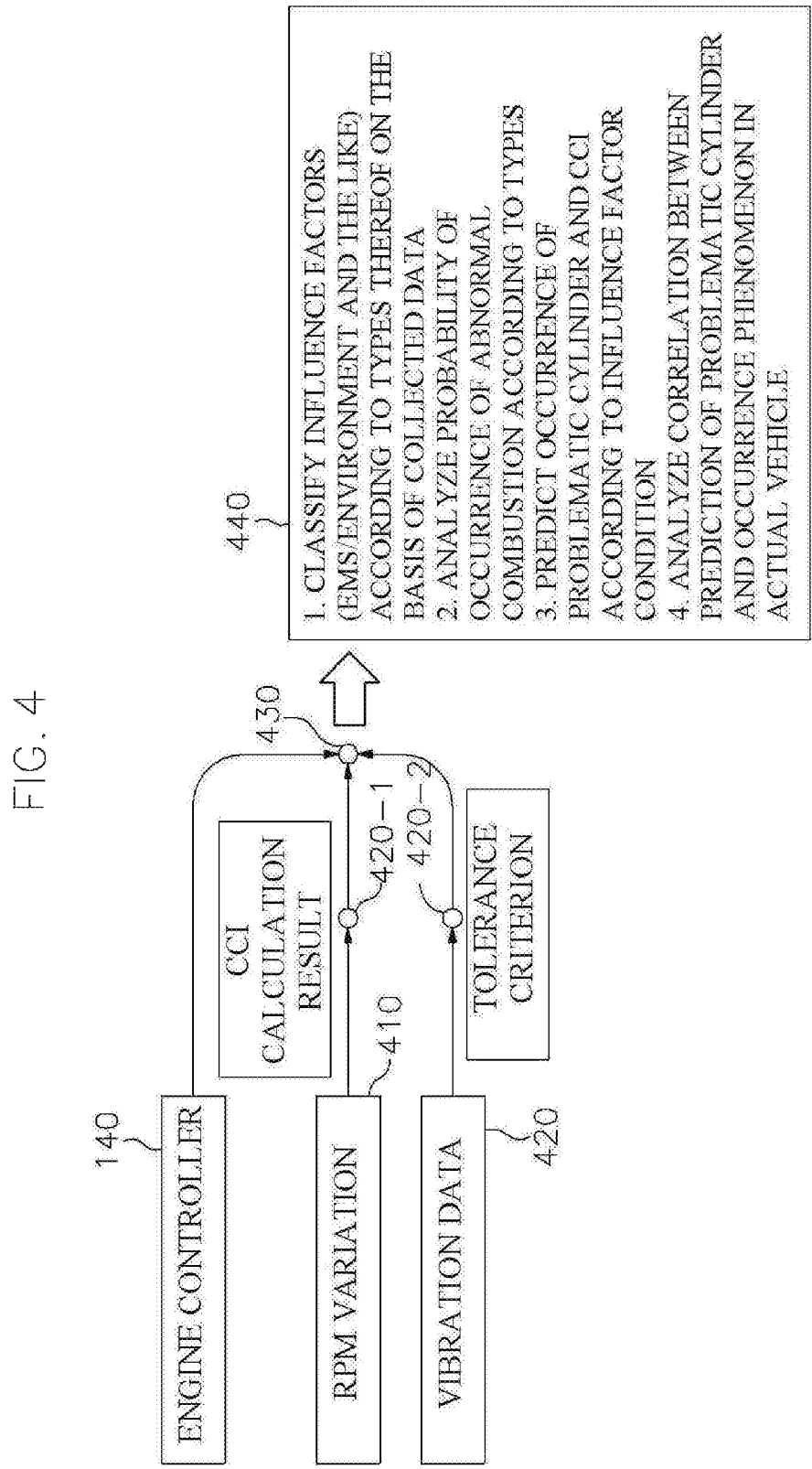
FIG. 4 is a conceptual diagram illustrating big data-based diagnosis and prediction in one form of the present disclosure.

FIG. 4 is a conceptual diagram illustrating big data-based diagnosis and prediction in some forms of the present disclosure. Referring to FIG. 4, various pieces of state monitoring data of the engine from the engine ECU 140, a CCI 420-1 calculated using an RPM variation 410 of the engine, and tolerance criterion satisfaction data 420-2 satisfying a tolerance criterion (i.e., within a range of a maximum value and a minimum value) using vibration data 420 are collected so that a big data 430 is constituted. The various pieces of state monitoring data may include the engine control data, and the engine control data may include the temperature information, the pressure information, combustion control information, the sensor information, and the like. The combustion control (FIE) information may include information on a fuel amount, a timing, and the like. The sensor information may include position information, information on the governor (an engine speed adjuster), and the like.

Diagnosis and analysis are performed using the collected big data 430. In other words, the influence factors for each cylinder are classified on the basis of the collected data. Further, a probability of occurrence of abnormal combustion for each cylinder may be analyzed. Further, it is possible to predict the occurrence of the problematic cylinder and the CCI according to the influence factor conditions. Further, a correlation between the prediction of the problematic cylinder and an occurrence phenomenon in the actual vehicle may be analyzed.

Figure 5:
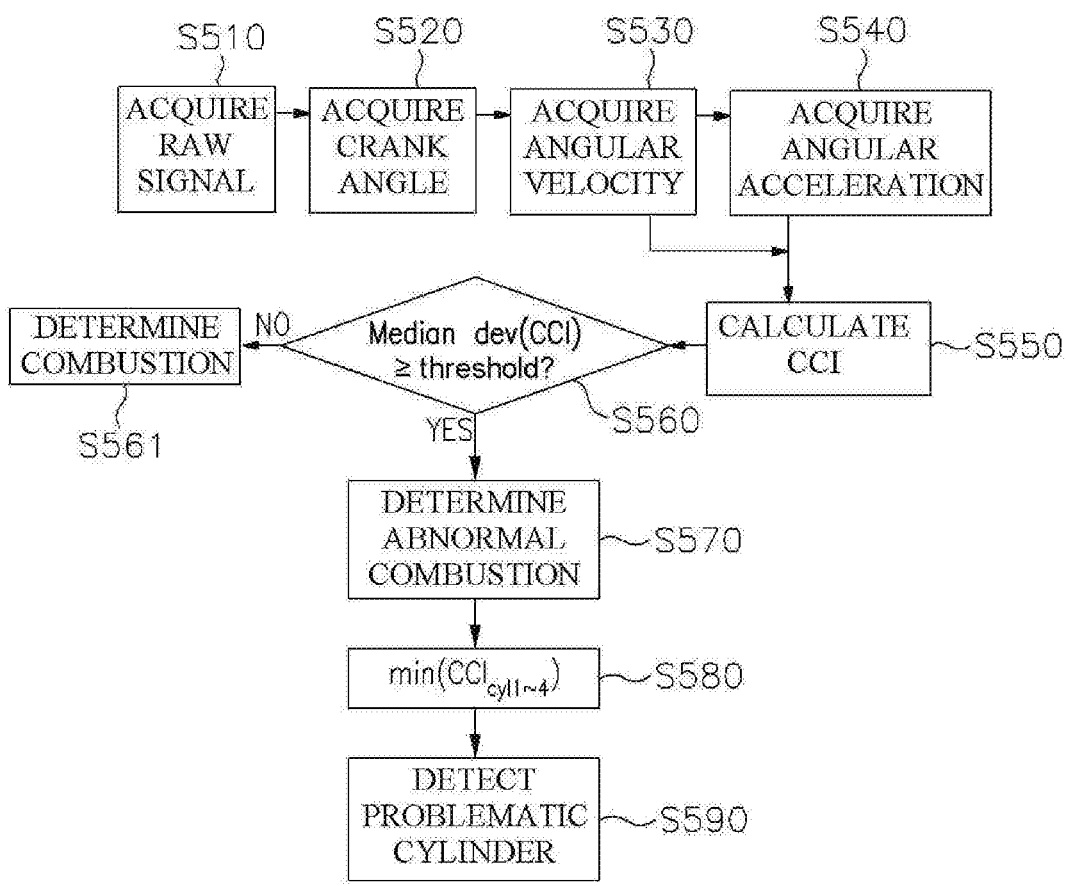
FIG. 5 is a flowchart illustrating an optimization process of diagnosing and classifying an irregular vibration using a combustion characteristic index (CCI) in one form of the present disclosure.

FIG. 5 is a flowchart illustrating an optimization process of diagnosing and classifying an irregular vibration using a combustion characteristic index (CCI) in some forms of the present disclosure. Referring to FIG. 5, the graphic controller 150 acquires a raw signal with respect to the engine 110 from the engine ECU 140 (S510). Thereafter, the graphic controller 150 acquires a crank angle, an angular velocity, and an angular acceleration from the low signal (S520, S530, and S540).

Then, the graphic controller 150 calculates a CCI in a specific section using the angular velocity and angular acceleration (S550). This is expressed by the following equation.

$$CCI = \frac{\int \alpha d\theta}{(\overline{\omega})^2} \quad \text{[Equation 1]}$$

Here, a is the angular acceleration (rad/sec²), and $\overline{\omega}$ is the angular velocity (rad/sec).

The CCI is calculated with respect to each cylinder. This is illustrated as follows.

TABLE 1

| Cylinder | CCI | Median | Median deviation value | Threshold | Minimum value | Problematic cylinder |
|---|---|---|---|---|---|---|
| 1cyl | 0.053377 | 0.103532 | 0.0252 | 0.006 | 0.053377 | 1 |
| 2cyl | 0.101006 | | | | | |
| 3cyl | 0.106825 | | | | | |
| 4cyl | 0.106057 | | | | | |

TABLE 1-continued

When a median deviation value with respect to a median is larger than a threshold, a cylinder having the smallest minimum value, among cylinders 1 cyl to 4 cyl, is determined as abnormal combustion (S560, S561, S570, S580, and S590).

The median is expressed by the following equation.

$$\text{Median deviation} = \sqrt{\frac{1}{N}\sum_{i=1}^{4}(n.i._{cyl_i} - \text{median}(n.i._{cyl_i}))^2} \quad \text{[Equation 2]}$$

Here, $n \cdot i \cdot cyl_i$ indicates a CCI value of a corresponding cylinder, and N is a positive natural number.

Figure 6:
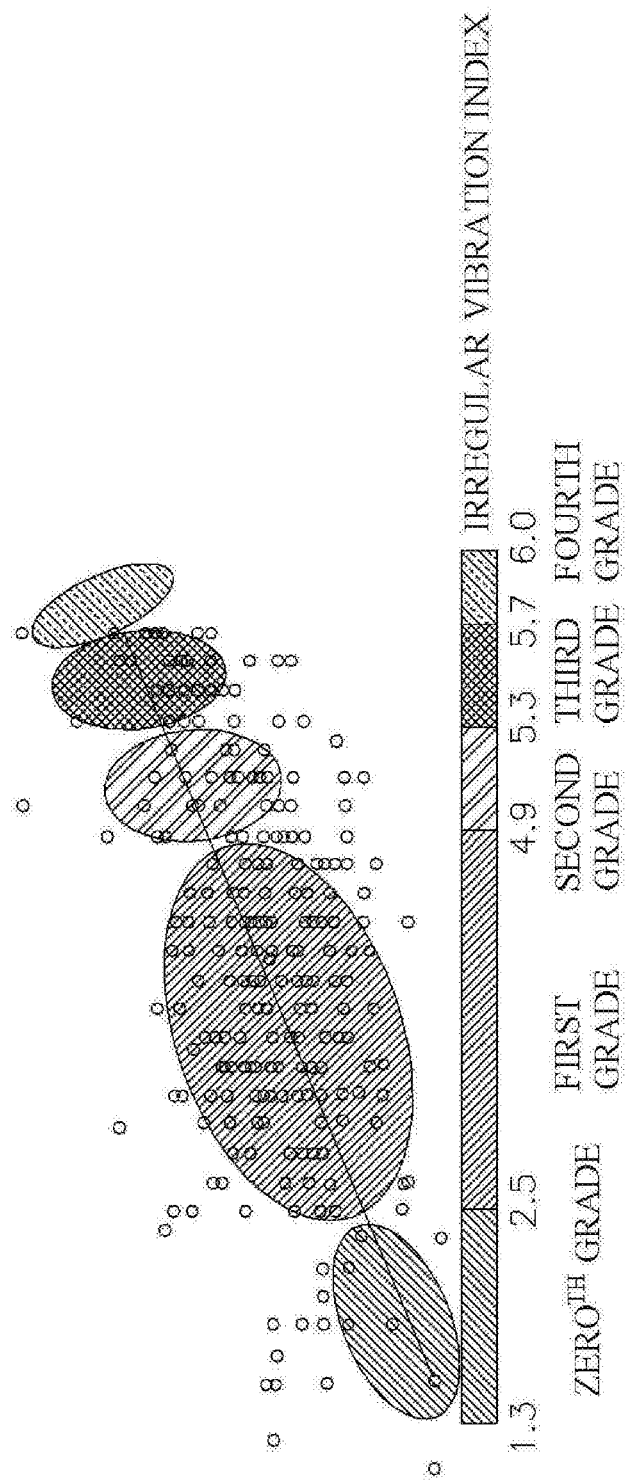
FIG. 6 is an example of a configuration of a primary clustering model at an irregular vibration level in one form of the present disclosure.

FIG. 6 is an example of a configuration of a primary clustering model at an irregular vibration level in some forms of the present disclosure. Referring to FIG. 6, a correlation coefficient r is calculated and classified first by performing correlation coefficient analysis between two variables on the big data. This is expressed by the following equation.

$$r = \frac{\sum_{i=1}^{n}(x_i - \overline{x})(y_i - \overline{y})}{\sqrt{\sum_{i=1}^{n}(x_i - \overline{x})^2}\sqrt{\sum_{i=1}^{n}(y_i - \overline{y})^2}} \quad \text{[Equation 3]}$$

Here, r is a correlation coefficient, and x and y may be different variables and correspond to state monitoring data and vibration data.

When the correlation coefficient r with respect to pieces of data is calculated, a k-means algorithm that is obtained by extending k representative variables (i.e., the collected number of pieces of the big data) is applied to classify the pieces of the big data into clusters (Cluster A, Cluster B, and Cluster C). Then, unsupervised learning is applied to improve accuracy of many correlation coefficients and a classification model of the CCI. That is, k-means+Gaussian mixture model (GMM)+deep neural network (DNN) is applied.

Referring to FIG. 6 again, irregular vibrations of the pieces of the big data, which are classified by applying the k-means+GMM+DNN thereto, are clustered according to grades on the basis of the CCIs. In other words, the primary deep learning model is generated by analyzing a correlation between the unsupervised learning and the CCIs according to a variation in characteristic of the state monitoring data and the vibration data. That is, a grade is matched according to the irregular vibration index. This is expressed by the following table.

TABLE 2

| | Irregular vibration index | | | | |
|---|---|---|---|---|---|
| | 1.3 to 2.5 | 2.6 to 4.9 | 5.0 to 5.3 | 5.4 to 5.7 | 5.8 to 6.0 |
| Grade | Zero$^{th}$ grade | First grade | Second grade | Third grade | Fourth grade |

The zero$^{th}$ grade to the fourth grade indicate four representative category classifications. A condition Min/Max for each category is determined. For example, in the case of the zero$^{th}$ grade, a CCI that is the irregular vibration index may range from a minimum value of 1.3 to a maximum value of 2.5.

In FIG. 6, a horizontal axis represents a category (i.e., grade), and a vertical axis represents a vibration level.

FIG. 7 illustrates an example of a configuration of a DNN-based irregular vibration grade classification model in some forms of the present disclosure.

Referring to FIG. 7, the big data is input to an input layer, and a hidden layer 1-4 indicates a trans function. An output layer indicates a class classified by a CCI value. In FIG. 7, the output layer is merely an example which is defined as five classes and, when the min/max of the CCI is classified, a total of five classes are defined. In FIG. 7, the input layer is merely an example of a result in which five correlation variables are extracted according to primary deep learning.

FIG. 8 is a flowchart illustrating a process of collecting irregular vibrations and data and providing a driver with a current state and service time information in some forms of the present disclosure. Referring to FIG. 8, the graphic controller 150 collects irregular vibration data and state monitoring data to perform irregular vibration diagnosis through deep learning (S810 and S820). A predictive model with respect to the irregular vibration is generated through the irregular vibration diagnosis (S830).

In other words, a long-short term memory (LSTM) algorithm or a gated recurrent unit (GRU) algorithm based on the recurrent neural network (RNN) that is a time series data model algorithm, and an attention algorithm for improving accuracy of a model are simultaneously applied to generate a predictive model that is the secondary deep learning model. That is, the above-described irregular vibration index is predicted through the irregular vibration diagnosis.

For example, when a current irregular vibration index is 2.3 to become a "zero$^{th}$ grade," a current driving habit is analyzed on the basis of the irregular vibration data and the state monitoring data which are collected through deep learning so that an irregular vibration index after one month may be predicted as a "second grade" of 5.2.

Consequently, in order to the predictive model, a sequential data prediction learning model is used. The sequential data prediction learning model predicts a level, which will progress, from the current state. Generally, the sequential data prediction learning model is used to predict the number of air passengers. In other words, a horizontal axis represents a time and a vertical axis represents the number of passengers, and a graph is constituted of an actual state, a past prediction, and a future prediction. The sequential data prediction learning model is well known, and thus a further description thereof will be omitted herein.

Referring to FIG. 8 again, in some forms of the present disclosure, sequential data includes all of the data collected from the vehicle 100 and a vehicle control communication part, and the CCI which is varied at this time. Further, the sequential data means data having a continuous value over time.

The prediction information according to the predictive model is transmitted to the central server 220 through the wireless communication part 180 (S840). Thereafter, the central server 220 compares the prediction information with a required value for vehicle maintenance and provides the driver with a current state and service time information (S850 and S860). In order for the above comparison, the required value for vehicle maintenance is stored in the central server 220. Therefore, when the prediction information is transmitted, the central server 220 compares the prediction information with the pre-stored required value for vehicle maintenance and transmits service time information indicating a time for which an inspection service for the vehicle 100 is required to the vehicle control communication part 160 and/or the communication terminal 230 of the driver (S860). In other words, the prediction information is individually stored in a time unit on the basis of the vehicle information including the VIN.

Further, the irregular vibration diagnosis is performed in a state of an idle condition of the engine 110 (S821). In this case, factors having high correlation are controlled, and, when an allowable range is exceeded, that is, in a state of being before the prediction result, the service time information is provided to the driver (S823 and S860).

Further, the operations of the method or algorithm described in some forms of the present disclosure may be implemented in the form of a program command which is executable through various computer means, such as a microprocessor, a processor, a central processing unit (CPU), and the like, and may be recorded in a computer-readable medium. The computer-readable medium may include program (command) codes, data files, data structures, and the like in alone or a combination thereof.

The program (command) codes recorded in the computer-readable medium may be specially designed and configured for some forms of the present disclosure or may be available to those skilled in the computer software. Examples of the computer-readable recording medium may include magnetic media such as a hard disk, a floppy disk, a magnetic tape, and the like, optical media such as a compact disc read only memory (CD-ROM), a digital versatile disc (DVD), a blue-ray disc, and the like, and semiconductor memory devices, which are specifically configured to store and execute program (command) codes, such as a ROM, a RAM, a flash memory, and the like.

Here, examples of the program (command) codes include machine language codes generated by a compiler, as well as high-level language codes which are executable by a computer using an interpreter or the like. The above-described hardware devices may be configured to operate as one or more software modules so as to perform an operation of the present disclosure, and vice versa.

In accordance with the present disclosure, there is an effect which is capable of diagnosing an irregular vibration for each cylinder in an idle condition of a vehicle and using a combustion characteristic index (CCI) having high performance as compared with engine roughness (ER).

Further, in accordance with the present disclosure, there is another effect which is capable of collecting big data such as a controller area network (CAN) signal of the vehicle, a measured value of an engine electronic control unit (ECU), an engine vibration signal, a seat vibration signal, and the like and analyzing a major factor influencing the diagnosis result of the CCI using a clustering model through unsupervised learning among deep learning techniques.

Further, in accordance with the present disclosure, there is still another effect which is capable of classifying, in order to constitute a clustering model using many types of data, an influence factor having high correlation with the CCI through the clustering model by the unsupervised learning using a k-means technique, a recurrent neural network (RNN) technique, and a deep neural network (DNN) technique.

Further, in accordance with the present disclosure, there is yet another effect which is capable of constituting a model for predicting an adverse effect generated due to a major component, specifically, a component significantly influencing degradation of an irregular vibration in the idle condition as a driving distance of the vehicle is increased and a change in environment becomes severe.

Further, in accordance with the present disclosure, there is still yet another effect which is capable of performing time data analysis by applying the RNN technique.

Further, in accordance with the present disclosure, there is still yet another effect which is capable of using a long-short term memory (LSTM) technique or a gated recurrent unit (GRU) technique among the RNN techniques and applying an attention algorithm so as to improve accuracy.

Further, in accordance with the present disclosure, there is still yet another effect which is capable of varying a control value in a direction of improvement of a major factor within a controllable range when the CCI is degraded.

Further, in accordance with the present disclosure, there is still yet another effect which is capable of storing a diagnosis result of a current state in a central server and making big data of an individual characteristic variation of the vehicle again.

Further, in accordance with the present disclosure, there is still yet another effect which is capable of predicting a required time of a service inspection in advance using a predictive model result and providing information to a driver.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A big data-based driving information provision system, comprising:
at least one sensor configured to measure and collect vehicle monitoring data regarding a vehicle and vibration data of an engine of the vehicle;
an engine electronic control unit (ECU) configured to measure state monitoring data of the engine;
a graphic controller configured to;
collect the vehicle monitoring data and the state monitoring data of the engine;
generate a combustion characteristic index (CCI) of the engine;
generate a primary deep learning model, wherein the primary deep learning model is configured to classify big data including the state monitoring data, the vehicle monitoring data, the vibration data, and the CCI into at least two data categories; and
generate a secondary deep learning model that is configured to predict an irregular vibration index in an idle state of the engine based on the primary deep learning model, and
a vehicle communication terminal configured to receive, from a central server, service time information indicating a time required for an inspection service by comparing prediction information based on the secondary deep learning model and a predetermined value for maintenance.

2. The big data-based driving information provision system of claim 1, wherein the primary deep learning model is configured to classify combinations of correlation coefficients between the big data into the at least two data categories.

3. The big data-based driving information provision system of claim 2, wherein the primary deep learning model is configured to classify the big data into clusters by applying a k-means algorithm to the correlation coefficients.

4. The big data-based driving information provision system of claim 3, wherein the primary deep learning model is configured to apply, after the k-means algorithm is applied, a Gaussian mixture model (GMM) and a deep neural network (DNN).

5. The big data-based driving information provision system of claim 1, wherein the ECU is configured to calculate the CCI using a crank angle, an angular velocity, and an angular acceleration of the engine.

6. The big data-based driving information provision system of claim 5, wherein the ECU is configured to:
calculate the CCI for each cylinder;
calculate a median deviation value according to:

$$\text{Median deviation} = \sqrt{\frac{1}{N}\sum_{i=1}^{4}(n.i._{cyl_i} - \text{median}(n.i._{cyl_i}))^2}$$

where i is an index value of a respective cylinder, $n \cdot i \cdot_{cyl_i}$ is the CCI of cylinder i, and N is a positive natural number; and
when the median deviation value is greater than a predetermined threshold, determine that the cylinder having a smallest minimum CCI is an abnormal combustion.

7. The big data-based driving information provision system of claim 1, wherein the graphic controller is configured to:
generate the at least two data categories for each cylinder of the engine.

8. The big data-based driving information provision system of claim 1, wherein the at least two data categories are:
an irregular vibration index based on the CCI; and
a grade and a vibration level which are matched to a range from a maximum value to a minimum value of the irregular vibration index.

* * * * *